US012587819B2

(12) United States Patent
Ferdi et al.

(10) Patent No.: US 12,587,819 B2
(45) Date of Patent: Mar. 24, 2026

(54) METHODS, APPARATUS, AND SYSTEMS USING CLOSED ACCESS GROUP (CAG) SUPPORT IN MINIMIZATION OF SERVICE INTERRUPTIONS (MINT)

(71) Applicant: InterDigital Patent Holdings, Inc., Wilmington, DE (US)

(72) Inventors: Samir Ferdi, Kirkland (CA); Behrouz Aghili, Commack, NY (US); Guanzhou Wang, Brossard (CA); Saad Ahmad, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 250 days.

(21) Appl. No.: 18/288,448

(22) PCT Filed: Apr. 25, 2022

(86) PCT No.: PCT/US2022/026167
§ 371 (c)(1),
(2) Date: Oct. 26, 2023

(87) PCT Pub. No.: WO2022/232039
PCT Pub. Date: Nov. 3, 2022

(65) Prior Publication Data
US 2024/0205658 A1 Jun. 20, 2024

Related U.S. Application Data

(60) Provisional application No. 63/181,481, filed on Apr. 29, 2021.

(51) Int. Cl.
*H04W 4/90* (2018.01)
*H04W 36/14* (2009.01)
(Continued)

(52) U.S. Cl.
CPC ........... *H04W 4/90* (2018.02); *H04W 36/144* (2023.05); *H04W 48/18* (2013.01); *H04W 36/13* (2023.05)

(58) Field of Classification Search
CPC ..... H04W 4/90; H04W 36/13; H04W 36/144; H04W 48/12; H04W 48/18
(Continued)

(56) References Cited

U.S. PATENT DOCUMENTS

2021/0410001 A1* 12/2021 Shi .................... H04W 28/0263
2022/0264275 A1* 8/2022 Vamanan ................ H04W 8/12
(Continued)

FOREIGN PATENT DOCUMENTS

WO    WO 2020262956 A1    12/2020

OTHER PUBLICATIONS

"3rd Generation Partnership Project; Technical Specification Group Core Network and Terminals; Study on the support for minimization of service interruption; (Release 17)", 3GPP TR 24.811 V0.2.0, Feb. 2021, 80 pages.
(Continued)

*Primary Examiner* — Hirdepal Singh
(74) *Attorney, Agent, or Firm* — Majid Albassam

(57) ABSTRACT

Methods, apparatus, and systems are disclosed. A method, implemented by a Wireless Transmit/Receive Unit (WTRU) may use a first Public Land Mobile Network (PLMN) not affected by a disaster condition and a second PLMN affected by a disaster condition. The method may include: receiving from a CAG cell of the first PLMN, broadcast information indicating: (1) that the CAG cell supports disaster inbound roaming (DIR) of WTRUs associated with the second PLMN and (2) that the CAG Cell accepts CAG-supporting disaster inbound roamers; selecting the CAG cell of the first PLMN based on the broadcasted information; and sending a
(Continued)

300

310
RECEIVE, BY THE WTRU FROM A CLOSED ACCESS GROUP (CAG) CELL OF THE FIRST PLMN, BROADCAST INFORMATION INDICATING THAT THE CAG CELL SUPPORTS DISASTER ROAMING (DR) OF WTRUS ASSOCIATED WITH THE SECOND PLMN

320
SEND, BY THE WTRU TO THE CAG CELL, A REGISTRATION REQUEST MESSAGE INCLUDING INFORMATION INDICATING A DR INDICATION AND AN IDENTIFIER OF THE SECOND PLMN

330
RECEIVE, BY THE WTRU, CAG INFORMATION ASSOCIATED WITH THE FIRST PLMN

340
INITIATE, BY THE WTRU, A CELL SELECTION PROCEDURE OR A CELL RESELECTION PROCEDURE USING THE RECEIVED CAG INFORMATION ASSOCIATED WITH THE FIRST PLMN

Registration Request message including information indicating a DIR indication and an identifier of the second PLMN. The method may further include receiving new CAG information associated with the first PLMN; and initiating a cell (re)selection procedure using the new CAG information associated with the first PLMN.

18 Claims, 5 Drawing Sheets

(51) Int. Cl.
  *H04W 48/18*      (2009.01)
  *H04W 36/00*      (2009.01)
(58) Field of Classification Search
  USPC ....................................................... 455/404.1
  See application file for complete search history.

(56)                References Cited

U.S. PATENT DOCUMENTS

| | | | | |
|---|---|---|---|---|
| 2023/0135827 A1* | 5/2023 | Kim | ...................... | H04W 48/12 |
| | | | | 370/329 |
| 2023/0156862 A1* | 5/2023 | Park | ...................... | H04W 48/18 |
| | | | | 455/404.1 |
| 2024/0015643 A1* | 1/2024 | Chaponniere | ......... | H04W 48/18 |

OTHER PUBLICATIONS

"3rd Generation Partnership Project; Technical Specification Group Core Network and Terminals; Study on the support for minimization of service interruption; (Release 17)", 3GPP Standard; Technical Report; 3GPP TR 24.811, 3rd Generation Partnership Project (3GPP), Mobile Competence Centre; 650, Route Des Lucioles; F-06921 Sophia-Antipolis Cedex ; France, vol. CT WG1, No. v1.0.0 Mar. 12, 2021 (Mar. 12, 2021), pp. 1-94, XP051999208, Retrieved from the Internet: URL: https: //ftp.3gpp.org/Specs/.

Third Generation Partnership Project, "Technical Specification Group Services and System Aspects; Procedures for the 5G System (5GS); Stage 2 (Release 17)," 3GPP TS 23.502 V17.0.0 (Mar. 2021).

Ericsson, "CAG related editor's notes", 3GPP Tdoc C1-210673, 3GPP TSG-CT WG1 Meeting #128-e, Electronic meeting; Feb. 25-Mar. 5, 2021, 4 pages.

Third Generation Partnership Project, "Technical Specification Group Services and System Aspects; System architecture for the 5G System (5GS); Stage 2 (Release 17)," 3GPP TS 23.501 V17.0.0 (Mar. 2021).

Apple, "Disaster roaming in Closed Access Group cells", 3GPP Tdoc C1-211059, 3GPP TSG CT WG1 Meeting #128-e, Electronic meeting, Feb. 25-Mar. 5, 2021, 2 pages.

* cited by examiner

Figures 3, 4:
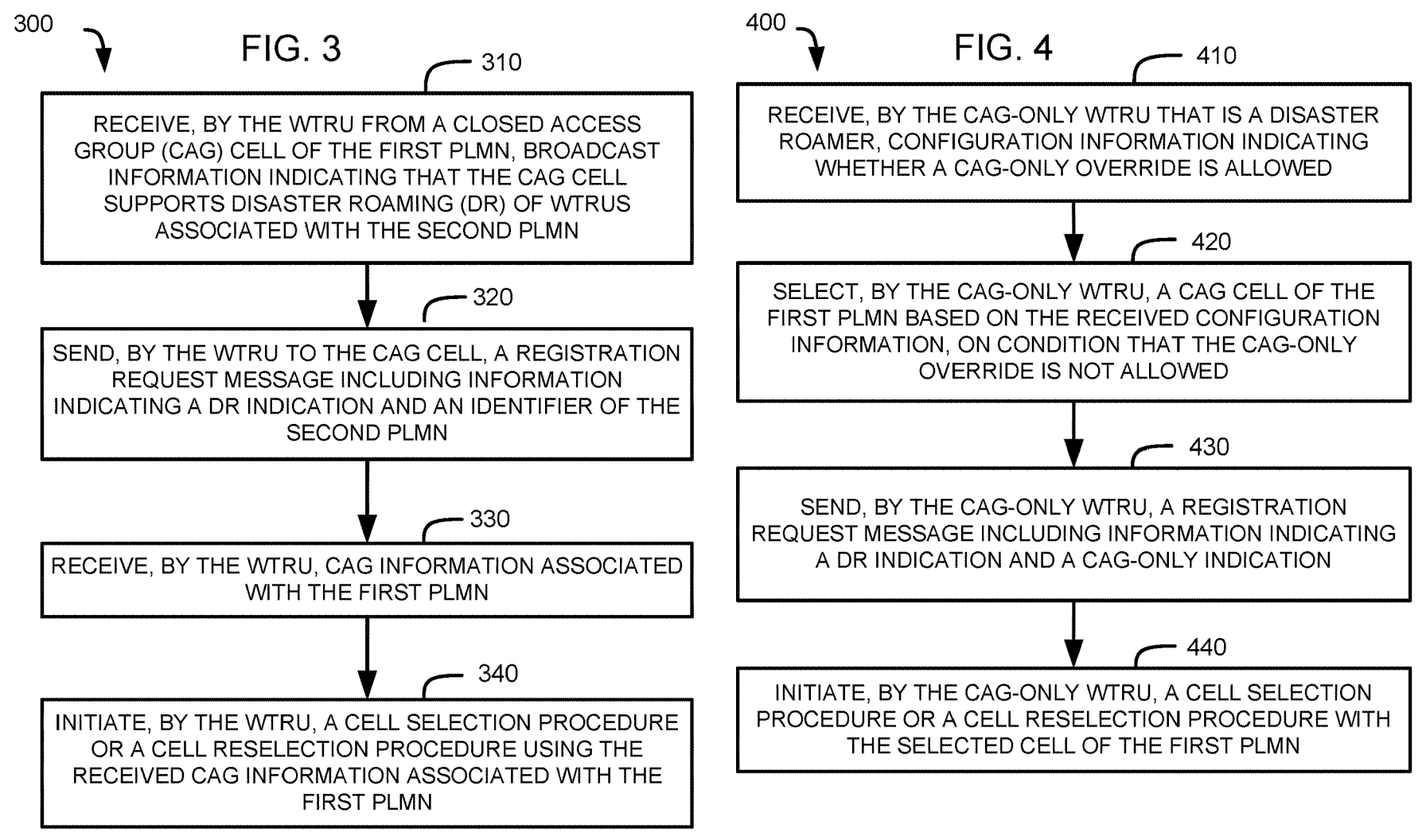

310 — RECEIVE, BY THE WTRU FROM A CLOSED ACCESS GROUP (CAG) CELL OF THE FIRST PLMN, BROADCAST INFORMATION INDICATING THAT THE CAG CELL SUPPORTS DISASTER ROAMING (DR) OF WTRUS ASSOCIATED WITH THE SECOND PLMN

320 — SEND, BY THE WTRU TO THE CAG CELL, A REGISTRATION REQUEST MESSAGE INCLUDING INFORMATION INDICATING A DR INDICATION AND AN IDENTIFIER OF THE SECOND PLMN

330 — RECEIVE, BY THE WTRU, CAG INFORMATION ASSOCIATED WITH THE FIRST PLMN

340 — INITIATE, BY THE WTRU, A CELL SELECTION PROCEDURE OR A CELL RESELECTION PROCEDURE USING THE RECEIVED CAG INFORMATION ASSOCIATED WITH THE FIRST PLMN

410 — RECEIVE, BY THE CAG-ONLY WTRU THAT IS A DISASTER ROAMER, CONFIGURATION INFORMATION INDICATING WHETHER A CAG-ONLY OVERRIDE IS ALLOWED

420 — SELECT, BY THE CAG-ONLY WTRU, A CAG CELL OF THE FIRST PLMN BASED ON THE RECEIVED CONFIGURATION INFORMATION, ON CONDITION THAT THE CAG-ONLY OVERRIDE IS NOT ALLOWED

430 — SEND, BY THE CAG-ONLY WTRU, A REGISTRATION REQUEST MESSAGE INCLUDING INFORMATION INDICATING A DR INDICATION AND A CAG-ONLY INDICATION

440 — INITIATE, BY THE CAG-ONLY WTRU, A CELL SELECTION PROCEDURE OR A CELL RESELECTION PROCEDURE WITH THE SELECTED CELL OF THE FIRST PLMN

Figures 5, 6:
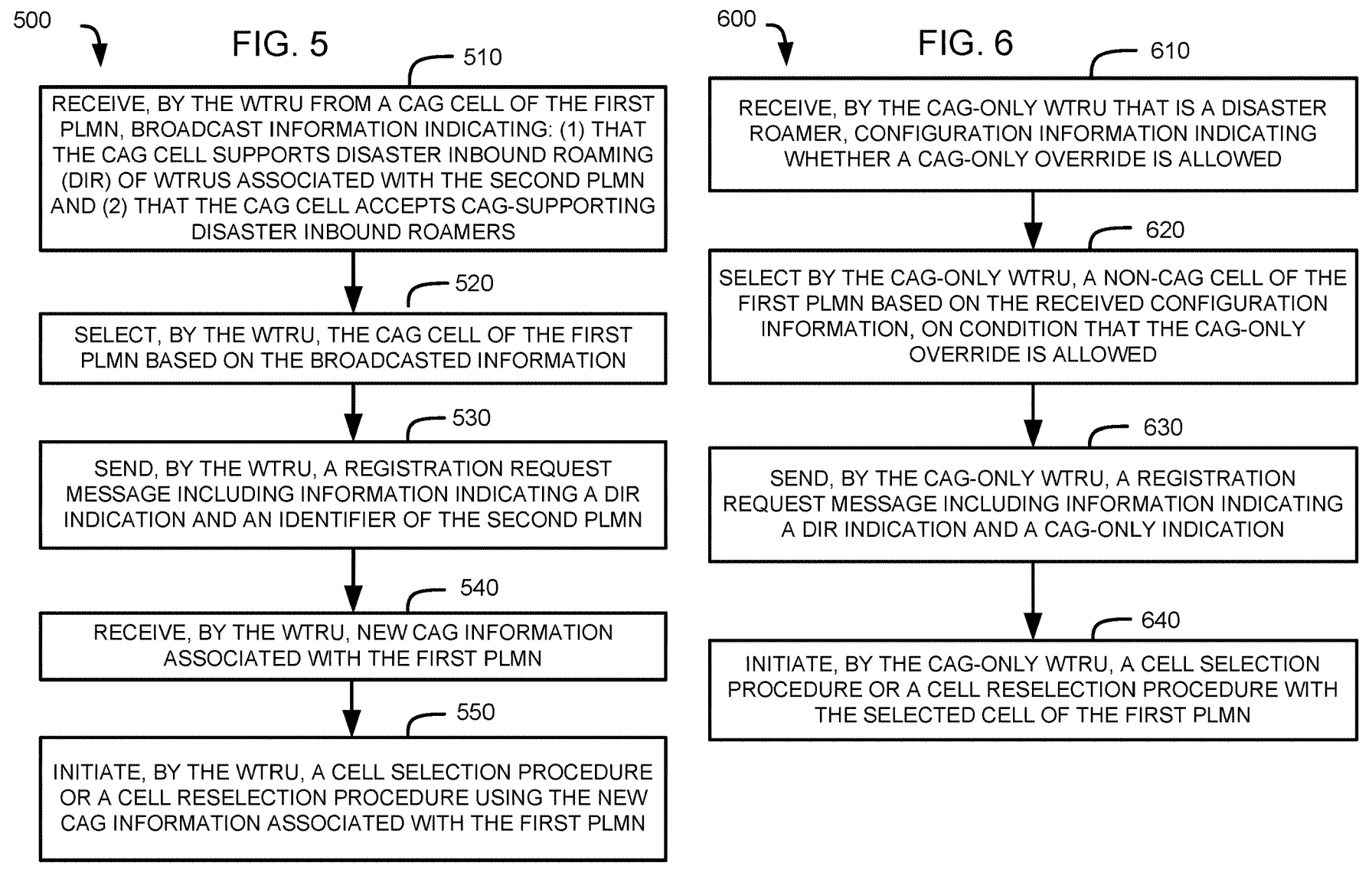

610 — RECEIVE, BY THE CAG-ONLY WTRU THAT IS A DISASTER ROAMER, CONFIGURATION INFORMATION INDICATING WHETHER A CAG-ONLY OVERRIDE IS ALLOWED

620 — SELECT BY THE CAG-ONLY WTRU, A NON-CAG CELL OF THE FIRST PLMN BASED ON THE RECEIVED CONFIGURATION INFORMATION, ON CONDITION THAT THE CAG-ONLY OVERRIDE IS ALLOWED

630 — SEND, BY THE CAG-ONLY WTRU, A REGISTRATION REQUEST MESSAGE INCLUDING INFORMATION INDICATING A DIR INDICATION AND A CAG-ONLY INDICATION

640 — INITIATE, BY THE CAG-ONLY WTRU, A CELL SELECTION PROCEDURE OR A CELL RESELECTION PROCEDURE WITH THE SELECTED CELL OF THE FIRST PLMN

510 — RECEIVE, BY THE WTRU FROM A CAG CELL OF THE FIRST PLMN, BROADCAST INFORMATION INDICATING: (1) THAT THE CAG CELL SUPPORTS DISASTER INBOUND ROAMING (DIR) OF WTRUS ASSOCIATED WITH THE SECOND PLMN AND (2) THAT THE CAG CELL ACCEPTS CAG-SUPPORTING DISASTER INBOUND ROAMERS

520 — SELECT, BY THE WTRU, THE CAG CELL OF THE FIRST PLMN BASED ON THE BROADCASTED INFORMATION

530 — SEND, BY THE WTRU, A REGISTRATION REQUEST MESSAGE INCLUDING INFORMATION INDICATING A DIR INDICATION AND AN IDENTIFIER OF THE SECOND PLMN

540 — RECEIVE, BY THE WTRU, NEW CAG INFORMATION ASSOCIATED WITH THE FIRST PLMN

550 — INITIATE, BY THE WTRU, A CELL SELECTION PROCEDURE OR A CELL RESELECTION PROCEDURE USING THE NEW CAG INFORMATION ASSOCIATED WITH THE FIRST PLMN

METHODS, APPARATUS, AND SYSTEMS USING CLOSED ACCESS GROUP (CAG) SUPPORT IN MINIMIZATION OF SERVICE INTERRUPTIONS (MINT)

CROSS REFERENCE TO RELATED APPLICATIONS

This application is a U.S. National Stage Application under 35 U.S.C. 371 of International Patent Application No. PCT/US2022/026167, filed Apr. 25, 2022, and claims the benefit of U.S. Provisional Application No. 63/181,481 filed Apr. 29, 2021, which is incorporated herein by reference in its entirety.

FIELD

Embodiments disclosed herein generally relate to wireless communications and, for example to methods, apparatus and systems using CAG support in MINT.

RELATED ART

In 3GPP, CAGs are specified.

SUMMARY

In certain representative embodiments, methods, procedures, systems and/or apparatus may be implemented to enable a WTRU 102 to access a CAG cell in another PLMN (e.g., a PLMN A, which may or may not be forbidden).

In certain representative embodiments, methods, procedures, systems and/or apparatus may be implemented to enable a CAG-only WTRU 102 to access a non-CAG cell in a PLMN (e.g., the PLMN A).

In certain representative embodiments, methods, procedures, systems and/or apparatus may be implemented to enable a CAG-supporting WTRU 102 of a selected PLMN D with a disaster condition to select and register with a forbidden PLMN A providing disaster roaming service.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 3 is a flow diagram illustrating a representative method implemented by a WTRU;

FIG. 4 is a flow diagram illustrating another representative method implemented by a WTRU;

FIG. 5 is a flow diagram illustrating a further representative method implemented by a WTRU; and FIG. 6 is a flow diagram illustrating an additional representative method implemented by a WTRU.

DETAILED DESCRIPTION

Example Networks for Implementation of the Embodiments

Figure 1A:
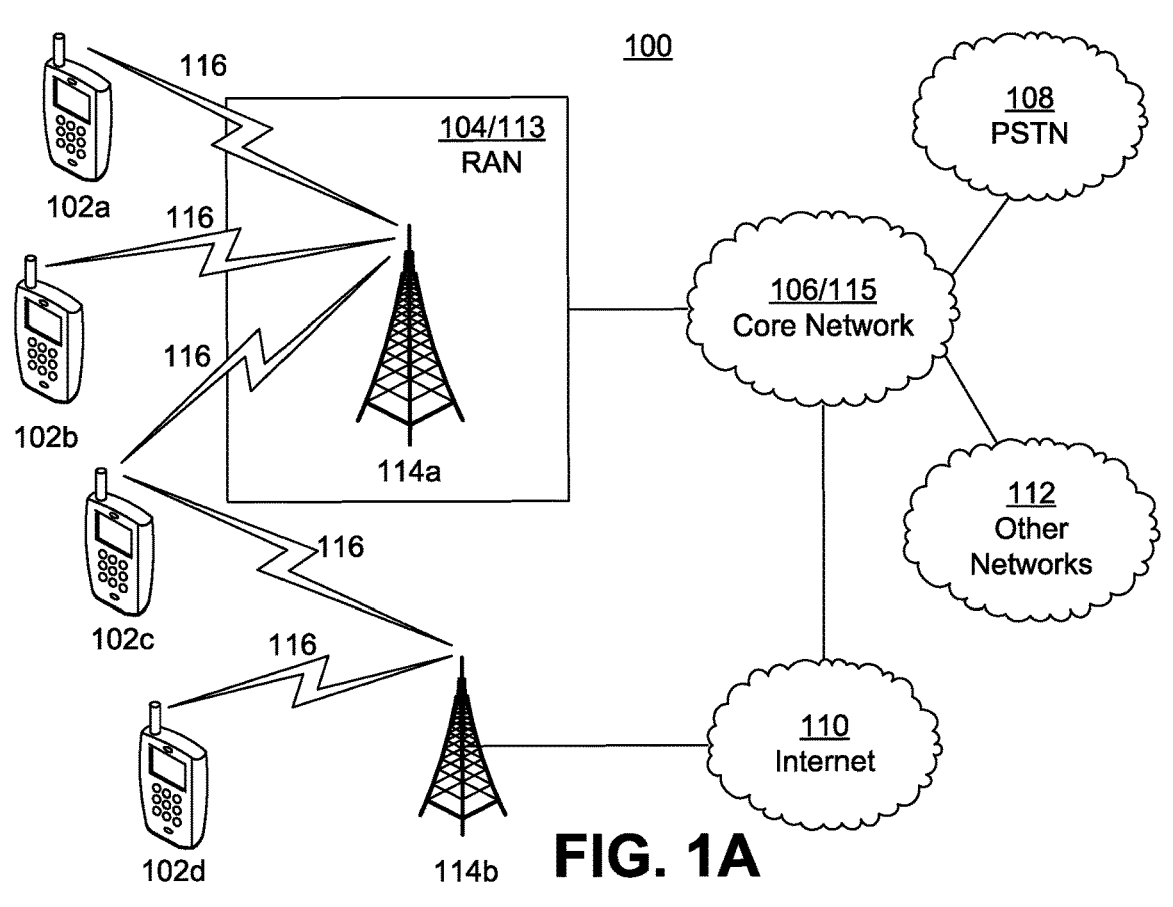
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (end), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers.

For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1C:
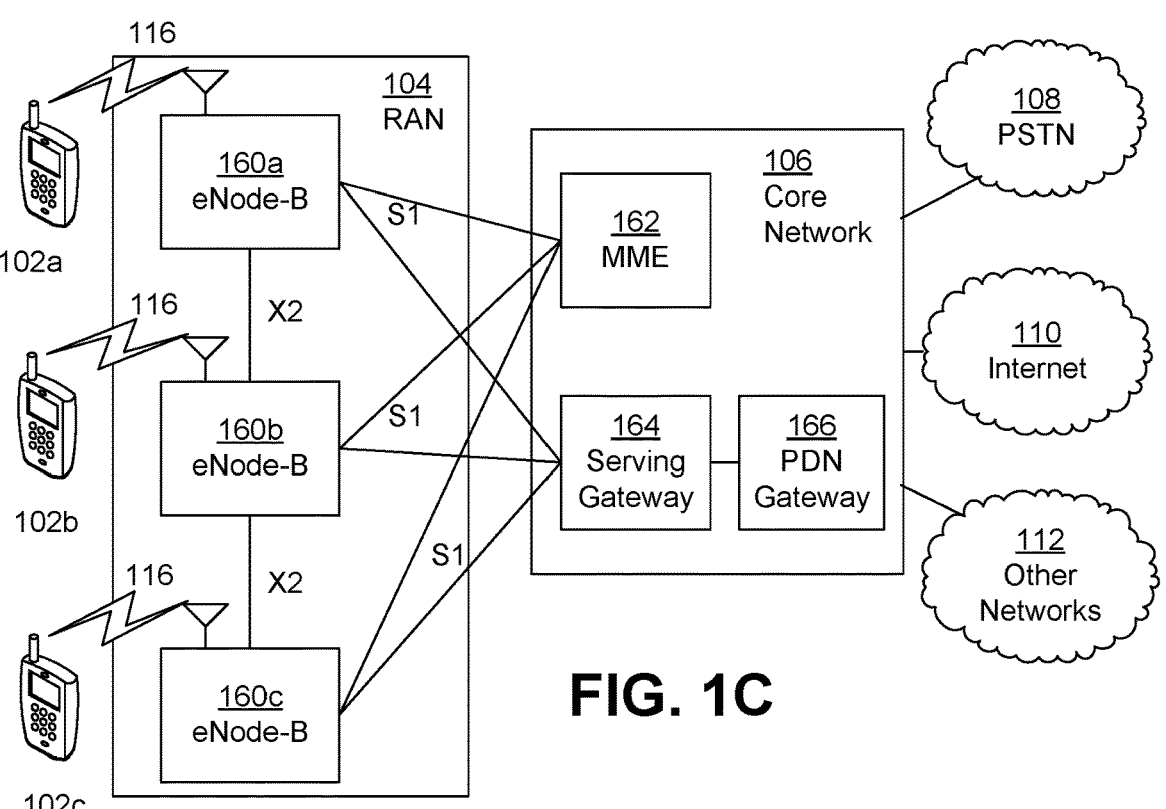
FIG. 1C is a system diagram illustrating an example radio access network (RAN) and an example core network (CN) that may be used within the communications system illustrated in FIG. 1A according to an embodiment.
Figures 1B, 1D:
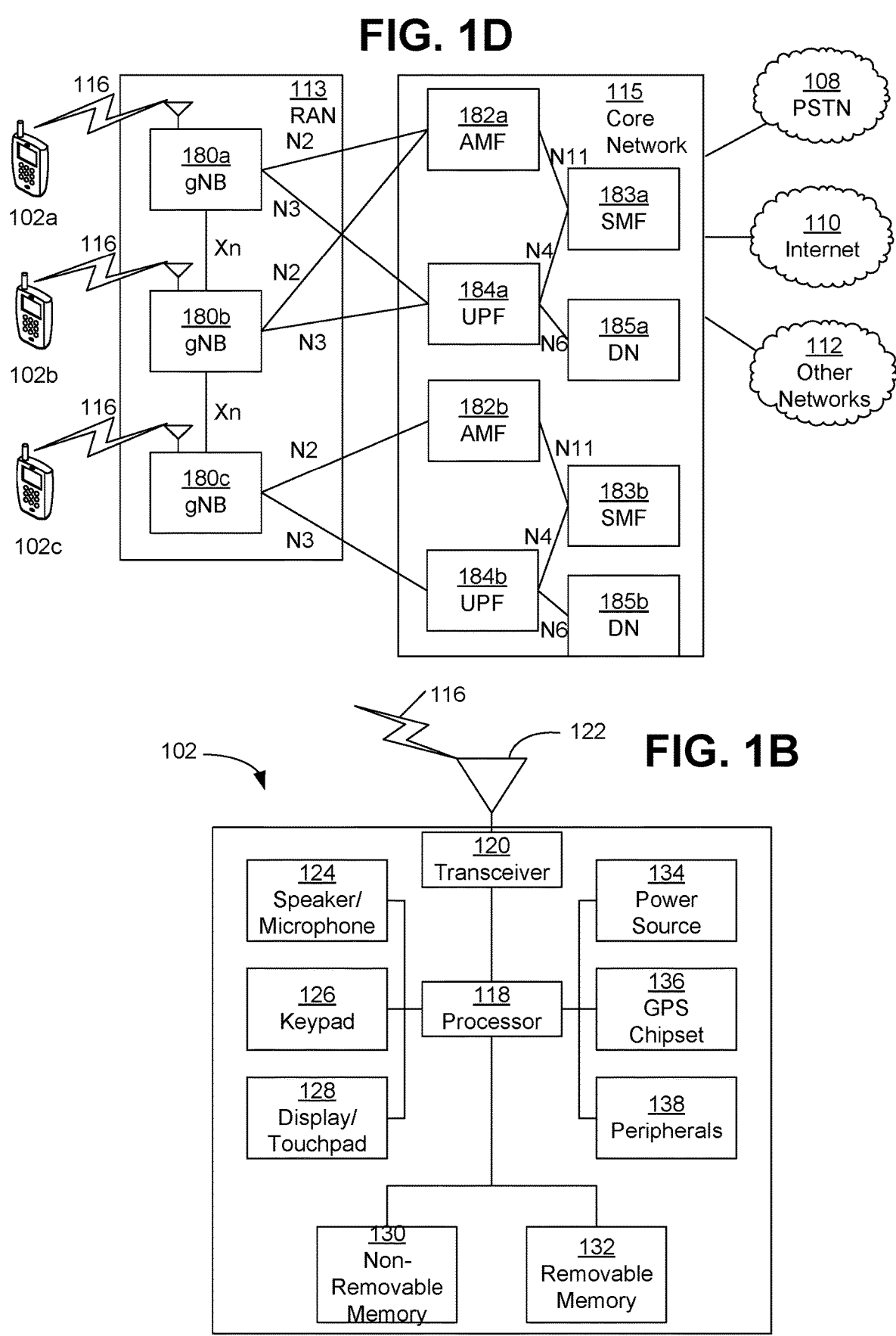
FIG. 1B is a system diagram illustrating an example wireless transmit/receive unit (WTRU) that may be used within the communications system illustrated in FIG. 1A according to an embodiment.
FIG. 1D is a system diagram illustrating a further example RAN and a further example CN that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHZ, 80 MHZ, and/or 160 MHz wide channels. The 40 MHZ, and/or 80 MHZ, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped onto the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHZ, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182*a*, 182*b*, at least one UPF 184*a*, 184*b*, at least one Session Management Function (SMF) 183*a*, and 183*b*, and possibly a Data Network (DN) 185*a*, 185*b*. While each of the foregoing elements is depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different Protocol Data Unit (PDU) sessions with different requirements), selecting a particular SMF 183*a*, 183*b*, management of the registration area, termination of Non-Access Stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency communication (URLLC) access, services relying on enhanced mobile (e.g., massive mobile) broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Representative Procedures for Disaster Inbound Roaming (DIR) with CAG interactions In certain representative embodiments, for DIR using CAG information of a PLMN (e.g., PLMN A), the WTRU 102 may select a CAG cell of the PLMN A (e.g., a forbidden PLMN). The PLMN/CAG cell may broadcast: (1) an indication that it supports DIR for the PLMN D; and/or (2) an indication that the CAG Cell accepts CAG-supporting disaster inbound roamers. The WTRU 102 may send a Registration Request message including the DIR indication and/or the identifier of the disaster PLMN (e.g., PLMN D ID). The PLMN with a disaster condition is generally referred to as PLMN D herein and a different PLMN (e.g., without a disaster condition) is generally referred to as PLMN A. PLMN A may or may not support WTRUs 102 that are disaster inbound roamers. The WTRU 102 may receive new CAG information for the PLMN A from the network (e.g., a network entity during a registration procedure and/or during a WTRU configuration update (WCU) procedure). The WTRU 102 may store the new CAG information for the PLMN A, which may be marked as reserved for DIR. The WTRU 102 may initiate a cell selection procedure and/or reselection procedure using the CAG information for the PLMN A.

In certain representative embodiments, the WTRU 102 may select the PLMN A (e.g., the forbidden or blacklisted PLMN A) on condition that at least one or more CAG IDs match the WTRU configured and/or allowed CAG ID for the disaster PLMN (e.g., PLMN D). The WTRU 102 may send a Registration Request message including a DIR indication and the selected/matching CAG ID.

In certain representative embodiments, the WTRU 102 may use one or more configured CAG IDs (e.g., based on the CAG information of the PLMN D) of a PLMN reserved for DIR service to select a CAG cell associated with the PLMN A (e.g., the forbidden/blacklisted PLMN). The CAG IDs reserved for the DIR (e.g., DIR service) may be associated with no PLMN or with a Home PLMN (HPLMN) and/or with a list of PLMNs (e.g., PLMN A, PLMN B, and/or PLMN D, among others).

For DIR for a CAG-only WTRU 102, the CAG-only WTRU 102 may use configured information/an indication that may indicate whether the CAG-only WTRU 102 is allowed to override the "CAG-only" setting/feature/indication in a case of DIR to access non-CAG cells, for example in the PLMN A. The WTRU 102 may select a non-CAG cell of the PLMN A on the condition that overriding the CAG-only setting/indication/feature is allowed. The WTRU 102 may send a registration request including the DIR indication and the "CAG-only" WTRU indication.

In certain embodiments, a CAG WTRU 102 may be accessing a CAG cell in PLMN D and the PLMN D may be affected by a disaster condition such that the CAG WTRU 102 may become a DIR WTRU 102.

In certain representative embodiments, methods, procedures, systems and/or apparatus may be implemented to enable a WTRU 102 to access a CAG cell in another PLMN (e.g., the PLMN A, which may or may not be forbidden). For example, by enabling MINT support in which disaster roaming is implemented, a PLMN (e.g., a HPLMN) may allow primary authentication to proceed, on condition that a WTRU 102 is authorized for disaster roaming.

In certain representative embodiments, methods, procedures, systems and/or apparatus may be implemented to enable a CAG-only WTRU 102 to access a non-CAG cell in a PLMN (e.g., the PLMN A) for example when the PLMN A does not have any CAG cells and/or does not have any available CAG cells (e.g., that are at least in a vicinity of the CAG-only WTRU 102).

In certain representative embodiments, methods, procedures, systems and/or apparatus may be implemented to enable a CAG-supporting WTRU 102 of a selected PLMN D with a Disaster Condition to select and register with a forbidden PLMN A providing disaster roaming service. For example, any of the following operations may be performed:

(1) the CAG supporting WTRU 102 may select a CAG cell of a forbidden PLMN (e.g., PLMN A's CAG cell) that may broadcast, communicate, and/or send any of: (i) an indication that the CAG cell/PLNM supports DIR for the PLMN D, and/or (ii) an indication that the CAG Cell accepts CAG-supporting disaster inbound roamers;

(2) the CAG supporting WTRU 102 may send a Registration Request message that includes a DIR indication and the disaster PLMN ID (e.g., the PLMN D ID);

(3) the CAG supporting WTRU 102 may receive new CAG info (e.g., information) for the PLMN A from the network (e.g., from a network entity, for example during a Registration and/or during a WTRU/UE Configuration Update (WCU) procedure);

(4) the WTRU 102 may store the new CAG info (e.g., information for the PLMN A), marked as reserved for DIR; and/or (5) the WTRU 102 may initiate a cell selection procedure or a cell reselection procedure using the CAG info (e.g., information for the PLMN A).

Figure 2:
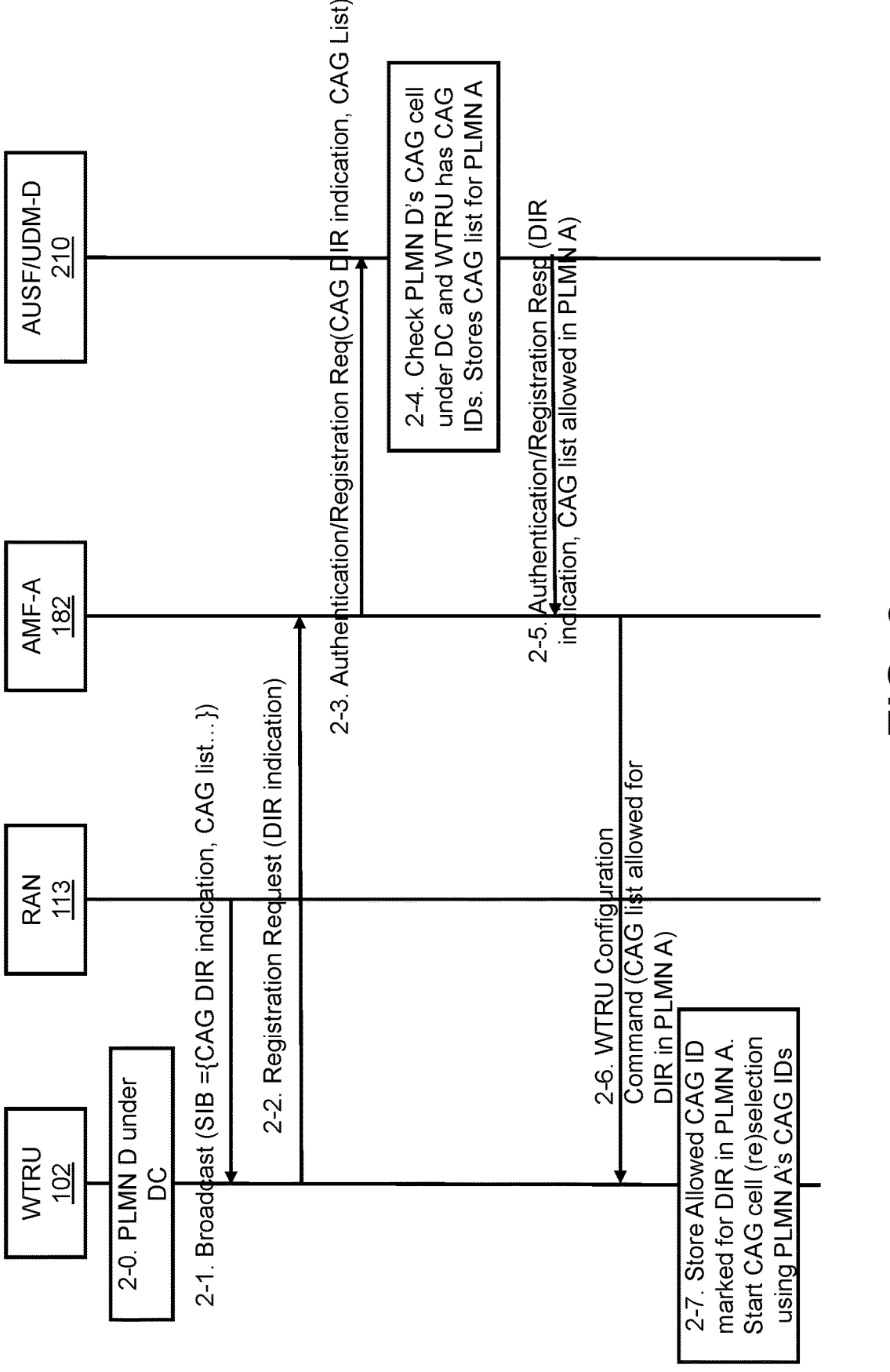
FIG. 2 is a diagram illustrating a representative procedure for CAG cell reselection of a disaster inbound roamer (DIR) (e.g., a WTRU).

FIG. 2 is a diagram illustrating a representative procedure for CAG cell reselection of a disaster inbound roamer (DIR) (e.g., a WTRU).

Referring to FIG. 2, at operation 2.0, the WTRU 102 may determine that the PLMN D in under/experiencing a disaster condition. At operation 2.1, the RAN 113 of PLMN A (which is not experiencing a disaster condition) may broadcast to the WTRU 102 information indicating a CAG DIR indication and/or a CAG list associated with PLMN A. For example, the CAG DIR indication may indicate that: (i) a CAG cell/PLNM supports DIR for the PLMN D, and/or (ii) an indication that the CAG Cell accepts CAG-supporting disaster inbound roamers. At operation 2.2, the WTRU 102 may send, to the AMF 182 of PMLN A, a registration request including information indicating a DIR indication (e.g., to indicate the WTRU 102 is a disaster inbound roamer (e.g., a WTRU 102 that is roaming from a PLMN that is experiencing a disaster/non-operational condition). The CAG supporting WTRU 102 may send a Registration Request message that includes the DIR indication and the disaster PLMN ID (e.g., the PLMN D ID). At operation 2-3, the AMF 182 of the PLMN A may send an authentication/registration request to an authentication service function (AUSF) and/or a unified data management (UDM) of the PLMN D (e.g., of the PLMN experiencing the disaster/non-operating condition). The authentication/registration request may include the CAG DIR indication and/or the CAG list. At operation 2-4, the AUSF/UDM of the PLMN D may check that the WTRU 102 has an allowed CAG list for the PLMN D, and that one or more of the Allowed CAG IDs are under/affected by a disaster condition. The UDM of the PLMN D may store the PLMN A's supported CAG IDs that accept CAG-supporting WTRU DIR, as the Allowed CAG IDs for the WTRU 102 in the PLMN A. At operation 2-5, the AUSF/UDM 210 of the PLMN D may send an authentication/registration response including the DIR indication and/or the CAG list of allowed CAGs in the PLMN A. For example, during the registration procedure with the PLMN A, when the WTRU 102 indicates that the WTRU 102 is registering for DIR, the PLMN A may request the PLMN D to provide mapping information/a list of allowed CAG IDs. The PLMN A may send the supported CAG IDs for a cell to the PLMN D. The PLMN D may check the allowed CAG IDs of the WTRU 102 and may send, to the PLMN A, the mapping information for mapping among or between the supported CAG IDs and the allowed CAG IDs.

The PLMN A may store the mapped CAG ID information and may send the mapped CAG ID information to the WTRU 102 in a Registration Accept message (not shown) or during a WTRU Configuration Update (WCU) procedure, after the registration procedure.

At operation 2-6, the AMF 182 of the PLMN A may send, to the WTRU 102, a WTRU configuration command including information indicating a CAG list of CAGs allowed for DIR in the PLMN A. At operation 2-7, the WTRU 102 may store the allowed CAG ID marked for DIR in the PLMN A and may start CAG cell selection or reselection using the CAG IDs of the allowed CAG cells of the PLMN A. For example, the WTRU 102 may use the mapped CAG ID information to select a CAG ID, which is broadcasted by the PLMN A. When the WTRU 102 receives the broadcasted CAG ID from the PLMN A, the WTRU 102 may check if there is corresponding mapping information with one of the allowed CAG IDs. The WTRU 102 may access the CAG cell, if there exists mapping information for one or more of the broadcasted CAG IDs. In some examples, the CAG supporting WTRU 102 may receive new CAG info (e.g., information) for the PLMN A from the network (e.g., from a network entity), for example during a Registration and/or during a WCU procedure). The WTRU 102 may store the new CAG info (e.g., information for the PLMN A), marked as reserved for DIR, and/or the WTRU 102 may initiate a cell selection procedure or a cell reselection procedure using the CAG info (e.g., the information for the PLMN A).

In certain representative embodiments, the DIR may use the CAG info (e.g., CAG information) of the PLMN with the disaster condition (e.g., PLMN D). For example, the WTRU 102 may select the CAG cell of the PLMN A (e.g., the forbidden/blacklisted PLMN) based on any of: (1) the CAG cell of PLMN A broadcasting an indication that it supports DIR for the PLMN D, (2) an indication that the CAG Cell accepts CAG-supporting disaster inbound roamers and/or (3) one or more CAG IDs matching the WTRU 102 configured allowed CAG ID for the PLMN D. The WTRU 102 may send a Registration Request message including the DIR indication and/or the selected CAG ID.

In certain representative embodiments, a DIR may use the mapped allowed CAG info (e.g., CAG information). For example, the WTRU 102 may select the CAG cell of the PLMN A (e.g., the forbidden/blacklisted PLMN) that supports DIR. The WTRU 102 may send a Registration Request message including the DIR indication and/or the PLMN ID of the PLMN D. The WTRU 102 may receive new mapped CAG IDs (e.g., of the PLMN D and/or of the PLMN A) from the network (e.g., a network entity). The WTRU 102 may perform CAG re-selection and/or may select the CAG cell of the PLMN A, if one of the broadcast CAG IDs matches one of the mapped CAG IDs.

In certain representative embodiments, methods, apparatus and/or systems may be implemented for DIR using reserved CAG IDs. The WTRU 102 may use one or more configured CAG IDs reserved for DIR service to select the CAG cell of a PLMN (e.g., the forbidden/blacklisted PLMN A). The CAG IDs reserved for the DIR and/or a DIR service are associated with zero or more PLMNs (e.g., no PLMN, the HPLMN or with a list of PLMNs (e.g., the PLMN D and/or the PLMN A, among others).

In certain representative embodiments, DIR may be used for CAG-only WTRUs 102. For example, a CAG-only WTRU 102 may use a configured indication indicating whether the CAG-only WTRU 102 is allowed to override the "CAG-only" feature/settings/procedures/indication in case of DIR, for example to access one or more non-CAG cells in a PLMN (e.g., the PLMN A). The WTRU 102 may select a non-CAG cell of the PLMN A on a condition that overriding the CAG-only feature/setting/procedures/indication is allowed. The WTRU 102 may send a registration request including the DIR indication and a "CAG-only" WTRU indication.

Representative Procedures for Closed Access Groups (CAGs)

Access control for Public network integrated NPN (PNI-NPN) may be implemented using one or more Closed Access Groups (CAGs) or one or more Closed Subcriber Groups (CSGs). The term "Closed Subscriber Group" and the term "Closed Subscriber Group" may be used interchangeably herein.

A WTRU 102 may be configured with Allowed CAG identifiers (IDs) for a given PLMN. A Next Generation Radio Access Network (NG-RAN) cell may be configured with supported CAG IDs that the NG-RAN 113, a network entity and/or a gNB 180 may broadcast. The WTRU 102 may select the NG-RAN cell/CAG cell, on condition that the CAG IDs of the NG-RAN CAG cell overlap with an allowed CAG ID. The AMF 182 may verify that the WTRU 102 is allowed to access the cell and that the cell supported CAG IDs overlap with the WTRU allowed CAG ID.

CAG WTRUs 102 (e.g., Only CAG WTRUs 102) may access a CAG Cell. A CAG WTRU 102 configured with a CAG-only indication, unless overridden, may only be allowed to access the network via CAG cells.

Representative Procedures for Minimization of Service Interruption (MINT)

For Minimization of Service Interruption (MINT), a WTRU 102 of a selected PLMN D (e.g., a HPLMN or a Visiting PLMN (VPLMN)) experiencing a disaster (e.g., established to have or to have had a disaster condition and/or with a Disaster Condition), may select and/or may register on another PLMN (e.g., a white-listed/non-forbidden PLMN or blacklisted/forbidden PLMN, for example PLMN A) without a Disaster Condition (e.g., not affected by or experiencing a disaster condition). The PLMN for registration may be a blacklisted/forbidden PLMN, for example when no other white-listed (e.g., non-forbidden) PLMN is available and the forbidden PLMN (e.g., PLMN A) can accept Disaster Inbound Roamers from the PLMN D.

For a CAG WTRU 102 that is accessing or is allowed to access one or more CAG cells in the PLMN D, when the PLMN D is affected by or experiencing a disaster condition, the following issues may arise for the CAG WTRU 102 including how a CAG-supporting WTRU 102 may access a CAG Cell in the PLMN A. For example, the CAG WTRU 102 may be without a CAG configuration for the PLMN A (e.g., and the PLMN A may be a forbidden PLMN). For the PLMN A to verify if a WTRU 102 (e.g., a CAG WTRU 102) is allowed to access a CAG cell, the PLMN may need to run or may run a primary authentication first to obtain the Allowed CAG from the HPLMN as described above. However, for MINT support, verification (e.g., by the PLMN A and/or the HPLMN) that the CAG WTRU 102 is authorized for disaster roaming may be needed to be before/prior to the primary authentication being performed. In certain representative embodiments, the timing of these authorization may be modified to enable verification of the CAG WTRU authorization for disaster roaming prior to the primary authorization.

For a CAG-only WTRU 102 that is accessing or is allowed to access one or more non-CAG cells in a PLMN (e.g., the PLMN A), the following issues may arise for the WTRU 102 including how a CAG-only WTRU 102 may access a non-CAG cell in the PLMN A. For example, the PLMN A may not have any CAG cells available in the disaster condition affected area. In such a case, applicability of MINT may become limited (e.g., very limited or not possible) because the CAG-only WTRU 102 may not or will not be allowed to select any of the cells of PLMN A in the area of the CAG-only WTRU 102. In certain representative embodiments, the CAG-only WTRU 102 may still access one or more such non-CAGs cells of the PLMN using procedures set forth herein.

Representative Procedures for WTRUs to use PLMN D's Allowed CAG ID in PLMN A

It is contemplated that the PLMN D may inform the PLMN A and, for example, possibly the HPLMN of the WTRU 102, if different from the PLMN D, of the CAG IDs affected by a disaster condition. The CAG cell of the PLMN A may broadcast the supported CAG IDs from the PLMN D in an area where the PLMN A accepts CAG-supporting disaster inbound roamers.

Representative WTRU Behavior

When the WTRU 102 detects that a disaster condition applies, the WTRU 102 may select a CAG cell of the PLMN A on the condition that the CAG cell broadcasts any of: (1) an indication that it supports disaster inbound roamers of the PLMN D, (2) an indication that the CAG Cell accepts CAG-supporting disaster inbound roamers, and/or (3) one or more CAG IDs match the WTRU configured Allowed CAG ID for the PLMN D. For example, the broadcast indication for the CAG-supporting disaster inbound roamers may be on a per CAG ID basis or on a per PLMN basis. A human-readable network name per CAG ID may be used to indicate that a CAG ID accepts a DIR CAG-supporting WTRU 102, for example to enable a user to request manual CAG selection during DIR.

The WTRU 102 may send a Registration Request message indicating DIR, and/or the selected CAG ID. For example, the PLMN A may send to the HPLMN (e.g., in an authentication request message from an AMF 182 to an AUSF 210) an indication that the Registration Request message is any of: (1) for a CAG cell access, (2) the WTRU selected CAG ID and/or (3) CAG cell supported CAG IDs for the PLMN D.

The HPLMN may check that there is an overlap between: the WTRU selected CAG ID, the WTRU Allowed CAG ID in the PLMN D, the CAG IDs under a disaster condition, the CAG ID of the PLMN D that is supported by the PLMN A before allowing the WTRU 102 access to the PLMN A.

Representative Procedures for WTRUs to use PLMN A's Allowed CAG ID while disaster roaming in PLMN A It is contemplated that the PLMN D may inform the PLMN A (and, for example possibly the HPLMN of the WTRU 102, if different from the PLMN D) of the CAG IDs affected by/experiencing a disaster condition.

Representative WTRU Behavior

When the WTRU 102 detects that a disaster condition applies, the WTRU 102 may select the CAG cell of PLMN A, on the condition that the cell broadcasts any of: (1) an indication that the CAG cell supports disaster inbound roamers of the PLMN D, and/or (2) an indication that the CAG cell accepts CAG-supporting disaster inbound roamers. For example, the broadcast indication for the CAG-supporting disaster inbound roamers may be on a per CAG ID basis or on a per PLMN basis. A human-readable network name per CAG ID may be used to indicate/convey the CAG ID that accepts DIR CAG-supporting WTRUs 102, for example to enable a user to request manual CAG selection during DIR.

The WTRU 102 may send a Registration Request message indicating DIR and may include the PLMN ID of the PLMN D (e.g., if the PLMN D is not the HPLMN). For example, during registration, the PLMN A may send to the HPLMN an indication that the Registration Request message is for CAG cell access, and an indication that PLMN A supports CAG IDs that accept CAG-supporting WTRU DIR.

The HPLMN may check that the WTRU 102 has an Allowed CAG list for the PLMN D, and that one or more of the Allowed CAG IDs are under/affected by a disaster condition. The HPLMN (e.g., the UDM of the HPLMN) may store the PLMN A's supported CAG IDs that accept CAG-supporting WTRU 102 DIR, as Allowed CAG IDs for the WTRU 102 in the PLMN A. The HPLMN (e.g., the UDM) may indicate to the PLMN A (e.g., the AMF 182 of the PLMN A) that the CAG information in the WTRU subscription has changed and may trigger an update of the WTRU 102.

The WTRU 102 may receive from the PLMN A (e.g., the AMF 182 of the PLMN A) new CAG information in the Registration Accept message or during a WTRU Configuration Update (WCU) procedure after the registration procedure. The WTRU 102 may store the new CAG information for the PLMN A and may set/mark that the information as applying for disaster roaming.

The WTRU 102 may delete the received CAG information for the PLMN A, when the WTRU 102 is deregistered, switched off and/or the USIM is removed from the WTRU 102. When a disaster condition ends, the HPLMN (e.g., the UDM of the HPLMN) may trigger an update of the CAG information of the PLMN A in the CAG supporting WTRU 102 via the PLMN A (e.g., the AMF 182 of the PLMN A) (e.g., a deletion of WTRU's Allowed CAG for the PLMN A). For example, if the WTRU 102 receives a Registration Reject message indicating disaster roaming for the CAG supporting WTRU 102 is not allowed, the WTRU 102 may refrain from selecting the PLMN A until the WTRU 102 is switched off or until the USIM is removed.

The WTRU 102 may initiate a cell selection procedure or a cell reselection procedure using the received CAG information for the PLMN A. The WTRU 102 may select a cell different from the current cell based on the received CAG information of the PLMN A. For example, the WTRU 102 may select a different CAG cell, if none of the received CAG ID for PLMN A match supported CAG IDs of the current CAG cells. In another example, the WTRU 102, which may be configured as a CAG-only WTRU 102 in the PLMN D, may be allowed to select a non-CAG cell in the PLMN A, on the condition that the received CAG information for the PLMN A does not include a CAG-only indication.

Representative Procedures for WTRUs that use mapped Allowed CAG ID indications

During the registration procedure with the PLMN A, when the WTRU 102 indicates that the WTRU 102 is registering for DIR, the PLMN A may request the HPLMN to provide mapping information/a list of allowed CAG IDs. The PLMN A may send the supported CAG IDs for a cell to the HPLMN. The HPLMN may check the allowed CAG IDs of the WTRU 102 and may send, to the PLMN A, the mapping information for mapping among or between the supported CAG IDs and the allowed CAG IDs.

The PLMN A may store the mapped CAG ID information and may send the mapped CAG ID information to the WTRU 102 in a Registration Accept message or during a WTRU Configuration Update (WCU) procedure, after a registration procedure.

The WTRU 102 may use the mapped CAG ID information to select the CAG ID, which is broadcasted by PLMN A. When the WTRU 102 receives the broadcasted CAG ID from the PLMN A, the WTRU 102 may check if there is corresponding mapping information with one of the allowed CAG IDs. The WTRU 102 may access the CAG cell if there exists mapping information for one or more of the broadcasted CAG IDs.

Representative Procedures for WTRUs to Use Disaster Roaming Dedicated Allowed CAG IDs One or more unique CAG IDs (e.g., identifiers) may be reserved for disaster roaming purposes/services. The reserved CAG ID may not be associated with any PLMN; may be associated with the HLPMN of the WTRU 102; and/or may be associated with a list of PLMNs that support the disaster roaming for CAG users. The reserved CAG IDs may be unique for a list of PLMNs that support the disaster roaming for CAG users. For example, PLMN A and PLMN D may reserve common or equivalent CAG ID values for disaster roaming. When updating the CAG information of the served WTRUs 102, the CAG IDs may be marked with an indication indicating that the CAG is reserved for disaster roaming (e.g., using a separate indication or by setting some reserved bits as part of the CAG ID).

When a disaster condition applies, the disaster roaming accepting PLMNs may start to broadcast the reserved CAG IDs in CAG cells of those disaster roaming accepting PLMNs, and/or may broadcast the reserved CAG IDs in some of the non-CAG cells of those disaster roaming accepting PLMNs, for example turning the non-CAG cells into a "hybrid cell" (for example, supporting both non-CAG WTRU access and CAG WTRU access).

The CAG capable WTRUs 102 that support disaster roaming may be configured with a list of CAG IDs reserved for disaster roaming, in addition to or in lieu of a normal allowed CAG list. When the disaster condition occurs, the WTRU 102 may use the list of the reserved CAG IDs instead of the normal allowed CAG list. If there are PLMNs associated with the reserved CAG IDs, the WTRU 102 may search for those PLMNs for disaster roaming first. If there is no PLMN associated with the reserved CAG IDs, the WTRU 102 may search the PLMN that supports disaster roaming for CAG users as described herein or may use the reserved CAG ID associated with the HPLMN of the WTRU 102. After the PLMN is selected, the WTRU 102 may search for/look for cells that broadcast reserved CAG IDs. If the one or more broadcasted reserved CAG IDs match the list of reserved CAG IDs stored in the WTRU 102, the WTRU 102 may select the associated CAG cell. The WTRU 102 may indicate the selected reserved CAG ID in the Registration request.

Representative Procedures for WTRUs overriding a CAG-only configuration for Disaster Roaming CAG-only WTRUs 102 that support disaster roaming may be configured with an indication indicating whether they are allowed to override the "CAG-only" setting/feature/indication in case of a disaster condition. If the configuration indicates that a CAG-only WTRU 102 is allowed to override the "CAG-only" setting/feature/indication, the WTRU 102 may ignore the "CAG-only" setting/feature/indication and may access normal cells (e.g., non-CAG cells) in the disaster roaming PLMN. The WTRU 102 may indicate that the WTRU 102 is a "CAG-only" WTRU in the Registration request to the network, and the network may determine whether to accept CAG-only WTRU access from a non-CAG cell based on network policy and the agreement with the HPLMN. For example, during a WTRU registration for disaster roaming, the PLMN A may indicate to the HPLMN that the WTRU 102 is registering from a non-CAG cell. The HPLMN may determine whether to allow the WTRU 102 to access the non-CAG cell in the PLMN A based on WTRU subscription data. The HPLMN may provide the configured allowed CAG list of the HPLMN and/or the reserved CAG list of the HPLMN to the network.

Representative Procedures for Pre-configuration of the WTRUs and the accepting networks During the registration in the PLMN D, the WTRU 102 may indicate to the AMF 182 that the WTRU 102 is capable of MINT features/operations/procedures (e.g., has MINT capabilities), by e.g., modifying the 5GMM Capability IE and/or by introducing/using a dedicated (e.g., new dedicated) IE for this purpose. At the same time, the WTRU 102 is a CAG WTRU, using a CAG cell. The AMF 182 of the PLMN D may inform the WTRU 102, either in a Registration Accept message or a Configuration Update Command message when disaster occurs, that the WTRU 102 is allowed to use the PLMN A ID (e.g., the PLMN identity) in the case of disaster roaming in the PLMN A. For example, the WTRU 102, upon finding a cell in PLMN A that broadcast CAG-IDs, may select that cell and may perform a registration attempt. On the network side, the PLMN D may already have informed the PLMN A once the disaster (e.g., a disaster condition) occurred in the PLMN D. The AMF 182 of the PLMN A, after receiving the Registration Request message from the WTRU 102, may assign a new list of allowed CAG-IDs to the WTRU 102 to be used from then on (e.g., until a second list is assigned) in the PLMN, for the subsequent registration attempts. The WTRU 102 may consider/use the new list as a "Temporarily allowed CAG List for PLMN A". For example, having the new list may provide a benefit that the WTRU 102 may not have to override CAG access in the PLMN A, if the WTRU 102 performs a cell selection to another CAG cell within the PLMN A.

When the disaster is over (e.g., has ended), the WTRU 102 may remove the new list. This can be done either by: (1) PLMN selection back to the PLMN D in Idle Mode, or (2) a deregistration procedure in Connected Mode. In the latter case (e.g., for Connected Mode), the AMF 182 of the PLMN A may send the Deregistration Message to the WTRU 102 and may use a certain Cause Code for the WTRU 102 to flush the list. It is contemplated that another procedure to achieve the same outcome may be that the WTRU 102 may automatically flush the list, when the WTRU 102 deregisters from the PLMN A.

FIG. 3 is a flow diagram illustrating a representative method implemented by a WTRU. For example, the representative method may use a first Public Land Mobile Network (PLMN) this is not affected by (e.g., does not experience) a disaster condition and a second PLMN affected by (e.g., experiencing) a disaster condition.

Referring to FIG. 3, the representative method 300 may include, at block 310, the WTRU 102 receiving from a Closed Access Group (CAG) cell of the first PLMN, broadcast information indicating that the CAG cell supports disaster roaming (DR) of WTRUs associated with the second PLMN. At block 320, the WTRU 102 may send, to the network via the CAG cell, a registration request message including information indicating a DR indication and an identifier of the second PLMN. At block 330, the WTRU 102 may receive CAG information associated with the first PLMN. At block 340, the WTRU 102 may initiate a cell selection procedure or a cell reselection procedure using the received CAG information associated with the first PLMN.

In certain representative embodiments, the WTRU 102 may select the CAG cell of the first PLMN based on the broadcasted information. For example, the broadcast information may further indicate that the CAG Cell accepts CAG-supporting disaster roamers.

In certain representative embodiments, the DR may include any of: (1) disaster inbound roaming; and/or (2) roaming (e.g., to a second network from a first network) using a WTRU/UE, when the first network is non-operational and/or is experiencing (e.g., is under) disaster conditions.

In certain representative embodiments, the WTRU 102 may store the received CAG information associated with the first PLMN, which is indicated as reserved for the DR.

For example, the selection of the CAG cell of first PLMN based on the broadcasted information may include the WTRU 102 selecting the CAG cell of first PLMN based on any of: (1) a CAG identifier (ID) indicated in the broadcasted information matching a WTRU-configured allowed CAG ID associated with the second PLMN; (2) mapping information indicating an allowed CAG ID associated with the first PLMN mapped to the second PLMN; (3) the CAG ID indicated in the broadcasted information corresponding to a CAG ID of an overlapped CAG cell of the second PLMN; and/or (4) the CAG cell of the first PLMN overlapping with a cell of the second PLMN.

In certain representative embodiments, the information included in the registration request message may include information further indicating a selected CAG identifier (ID).

In certain representative embodiments, the WTRU 102 may select the CAG cell of first PLMN further based on predetermined CAG IDs that are reserved for a DR service. For example, the CAG IDs that are reserved for the DR service may be associated with any of: (1) no PLMN; (2) a Home PLMN and/or (3) a plurality of PLMNs.

In certain representative embodiments, the reception of the CAG information associated with the first PLMN may occur during a registration procedure or a WTRU/UE configuration update (WCU) procedure.

In certain representative embodiments, the first PLMN may be a forbidden and/or blacklisted PLMN.

In certain representative embodiments, the WTRU 102 may receive information indicating that the disaster condition for the second PLMN has ended; and the WTRU 102 may deregister the WTRU 102 with the first PLMN after the reception of the information that the disaster condition has ended for the second PLMN.

FIG. 4 is a flow diagram illustrating another representative method implemented by a CAG-only WTRU (for example using a first PLMN).

Referring to FIG. 4, the representative method 400 may include, at block 410, the CAG-only WTRU 102 that is a disaster roamer receiving configuration information indicating whether a CAG-only override is allowed. At block 420, the CAG-only WTRU 102 may select a CAG cell of the first PLMN based on the received configuration information, on condition that the CAG-only override is not allowed. At block 430, the CAG-only WTRU 102 may send a Registration Request message including information indicating a DR indication and a CAG-only indication. At block 440, the CAG-only WTRU 102 may initiate a cell selection procedure or a cell reselection procedure with the selected cell of the first PLMN.

FIG. 5 is a flow diagram illustrating a further representative method implemented by a WTRU (for example, the WTRU may use a first Public Land Mobile Network (PLMN) not affected by a disaster condition and a second PLMN affected by a disaster condition).

Referring to FIG. 5, the representative method 500 may include, at block 510, the WTRU 102 receiving, from a CAG cell of the first PLMN, broadcast information indicating: (1) that the CAG cell supports disaster inbound roaming (DIR) of WTRUs associated with the second PLMN and (2) that the CAG Cell accepts CAG-supporting disaster inbound roamers. At block 520, the WTRU 102 may select the CAG cell of the first PLMN based on the broadcasted information. At block 530, the WTRU 102 may send a Registration Request message including information indicating a DIR indication and an identifier of the second PLMN. At block 540, the WTRU 102 may receive new CAG information associated with the first PLMN. At block 550, the WTRU 102 may initiate a cell selection procedure or a cell reselection procedure using the new CAG information associated with the first PLMN.

In certain representative embodiments, the WTRU 102 may store the new CAG information associated with the first PLMN, marked as reserved for DIR.

In certain representative embodiments, the selection of the CAG cell of first PLMN being based on the broadcasted information may include selecting the CAG cell of first PLMN based on a CAG ID indicated in the broadcasted information matching a WTRU configured allowed CAG ID associated with the second PLMN.

In certain representative embodiments, the selection of the CAG cell of first PLMN being based on the broadcasted information may include selecting the CAG cell of first PLMN based on mapping information indicating an allowed CAG ID associated with the first PLMN mapped to the second PLMN.

In certain representative embodiments, the information in the Registration Request message may include information further indicating a selected CAG ID.

In certain representative embodiments, the selection of the CAG cell of the first PLMN may be further based on predetermined CAG IDs that are reserved for a DIR service. For example, the CAG IDs that are reserved for DIR service may be associated with any of: (1) no PLMN; (2) a Home PLMN and/or (3) a plurality of PLMNs.

In certain representative embodiments, the reception of the new CAG information associated with the first PLMN may occur during a registration procedure or a WTRU/UE Configuration Update (WCU) procedure.

FIG. 6 is a flow diagram illustrating an additional representative method implemented by a CAG-only WTRU, for example using a first PLMN.

Referring to FIG. 6, the representative method 600 may include, at block 610, the CAG-only WTRU 102 that is a disaster roamer receiving configuration information indicating whether a CAG-only override is allowed. At block 620, the CAG-only WTRU 102 may select a non-CAG cell of the first PLMN based on the received configuration information, on condition that the CAG-only override is allowed. At block 630, the CAG-only WTRU 102 may send a Registration Request message including information indicating a DIR indication and a CAG-only indication. At block 640, the CAG-only WTRU 102 may initiate a cell selection procedure or a cell reselection procedure with the selected cell of the first PLMN.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention. Such software may run on a processor which is housed within a robotic assistance/apparatus (RAA) and/or another mobile device remotely. In the later a case, data may be transferred via wireline or wirelessly between the RAA or other mobile device containing the sensors and the remote device containing the processor which runs the software which performs the scale estimation and compensation as described above. According to other representative embodiments, some of the processing described above with respect to localization may be performed in the device containing the sensors/cameras, while the remainder of the processing may be performed in a second device after receipt of the partially processed data from the device containing the sensors/cameras.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM") or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods. It should be understood that the representative embodiments are not limited to the above-mentioned platforms or CPUs and that other platforms and CPUs may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mate-able and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 16 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Throughout the disclosure, one of skill understands that certain representative embodiments may be used in the alternative or in combination with other representative embodiments.

In addition, the methods described herein may be implemented in a computer program, software, or firmware incorporated in a computer readable storage medium as instructions for execution by a computer or processor to perform the actions described hereinabove. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method implemented by a wireless transmit/receive unit (WTRU) using a first Public Land Mobile Network (PLMN) not affected by a disaster condition and a second PLMN affected by a disaster condition, the method comprising:

receiving, by the WTRU from a Closed Access Group (CAG) cell of the first PLMN, broadcast information indicating that the CAG cell supports disaster roaming (DR) of WTRUs associated with the second PLMN;

sending, by the WTRU to a network entity, a registration request message including information indicating a DR indication and an identifier of the second PLMN;

receiving, by the WTRU, CAG information associated with the first PLMN, the CAG information indicating CAGs allowed for DR in the first PLMN;

storing the received CAG information associated with the first PLMN which is indicated as reserved for DR;

selecting, by the WTRU, the CAG cell of the first PLMN based on the broadcast information, wherein the broadcast information further indicates that the CAG Cell accepts CAG-supporting disaster roamers;

initiating, by the WTRU, a cell selection procedure or a cell reselection procedure using the received CAG information associated with the first PLMN.

2. The method of claim 1, wherein the DR includes any of: (1) disaster inbound roaming; and (2) roaming using equipment for disaster conditions.

3. The method of claim 1, wherein the selecting of the CAG cell of the first PLMN based on the broadcast information includes selecting the CAG cell of the first PLMN based on any of: (1) a CAG identifier (ID) indicated in the broadcast information matching a WTRU-configured allowed CAG ID associated with the second PLMN; (2) mapping information indicating an allowed CAG ID associated with the first PLMN mapped to the second PLMN; (3) the CAG ID indicated in the broadcast information corresponding to a CAG ID of an overlapped CAG cell of the second PLMN; and (4) the CAG cell of the first PLMN overlapping with a cell of the second PLMN.

4. The method of claim 1, wherein the information included in the registration request message includes information further indicating a selected CAG identifier (ID).

5. The method of claim 1, wherein:

the selecting of the CAG cell of first PLMN is further based on predetermined CAG IDs that are reserved for a DR service; and the CAG IDs that are reserved for the DR service are associated with any of: (1) no PLMN; (2) a Home PLMN; and (3) a plurality of PLMNs.

6. The method of claim 1, wherein the receiving of the CAG information associated with the first PLMN occurs during a registration procedure or a WTRU configuration update (WCU) procedure.

7. The method of claim 1, wherein the first PLMN is a forbidden or blacklisted PLMN.

8. The method of claim 1, further comprising:

receiving, by the WTRU, information indicating that the disaster condition for the second PLMN has ended; and deregistering the WTRU with the first PLMN after the receiving of the information that the disaster condition has ended for the second PLMN.

9. The method of claim 1, further comprising:

on condition that any of: (1) the WTRU is deregistered with the first PLMN, (2) the WTRU is switched off, and (3) a universal subscriber identity module (USIM) is removed from the WTRU, removing, by the WTRU, the CAG information associated with the first PLMN.

10. A wireless transmit/receive unit (WTRU), comprising:
a transceiver, configured to:
    receive, from a Closed Access Group (CAG) cell of a first PLMN that is not affected by a disaster condition, broadcast information indicating that the CAG cell supports disaster roaming (DR) of WTRUs associated with a second PLMN that is affected by a disaster condition;
    send, to a network entity, a registration request message including information indicating a DR indication and an identifier of the second PLMN; and
    receive CAG information associated with the first PLMN, the CAG information indicating CAGs allowed for DR in the first PLMN;
a memory configured to store the CAG information associated with the first PLMN which is indicated as reserved for DR;
a processor configured to:
    select the CAG cell of the first PLMN based on the broadcast information, wherein the broadcast information further indicates that the CAG Cell accepts CAG-supporting disaster roamers; and
    initiate a cell selection procedure or a cell reselection procedure using the received CAG information associated with the first PLMN.

11. The WTRU of claim 10, wherein the DR includes any of: (1) disaster inbound roaming; and (2) roaming using equipment for disaster conditions.

12. The WTRU of claim 10, wherein the processor is configured to select the CAG cell of first PLMN based on any of: (1) a CAG identifier (ID) indicated in the broadcast information matching a WTRU-configured allowed CAG ID associated with the second PLMN; (2) mapping information indicating an allowed CAG ID associated with the first PLMN mapped to the second PLMN; (3) the CAG ID indicated in the broadcast information corresponding to a CAG ID of an overlapped CAG cell of the second PLMN; and (4) the CAG cell overlapping with a cell of the second PLMN.

13. The WTRU of claim 10, wherein the information included in the registration request message further indicates a selected CAG identifier (ID).

14. The WTRU of claim 10, wherein:
    the selection of the CAG cell of first PLMN is further based on predetermined CAG IDs that are reserved for a DR service; and
    the CAG IDs that are reserved for the DR service are associated with any of: (1) no PLMN; (2) a Home PLMN; and (3) a plurality of PLMNs.

15. The WTRU of claim 10, wherein the transceiver is configured to receive the CAG information associated with the first PLMN during a registration procedure or a WTRU configuration update (WCU) procedure.

16. The WTRU of claim 10, wherein the first PLMN is a forbidden or blacklisted PLMN.

17. The WTRU of claim 10, wherein the processor and transceiver are configured to:
    receive information indicating that the disaster condition for the second PLMN has ended; and
    deregister the WTRU with the first PLMN after reception of the information that the disaster condition has ended for the second PLMN.

18. The WTRU of claim 10, wherein the processor is configured to remove the CAG information associated with the first PLMN, on condition that any of: (1) the WTRU is deregistered with the first PLMN, (2) the WTRU is switched off, and (3) a universal subscriber identity module (USIM) is removed from the WTRU.

\* \* \* \* \*